United States Patent Office 2,952,583
Patented Sept. 13, 1960

2,952,583
COMPOSITION AND METHOD FOR CONTROLLING PLANT VIRUSES

Lois L. Fritts, Midland, Mich., assignor to The Dow Chemical Company, Midland, Mich., a corporation of Delaware No Drawing. Filed Nov. 5, 1958, Ser. No. 771,962

7 Claims. (Cl. 167—30)

This invention relates to plant disease control and is particularly directed to compositions and processes to be employed in minimizing the incidence of virus infection in plants and thereby aiding in the prevention and control of plant disorders and diseases caused by virus organisms.

In the present state of the arts of plant pathology, the term "virus" as applied to plant pathogens is used to designate a plant-disease-causing agent which is invisible and so small that it will pass through an ordinary bacteria-proof filter. The exact biological and chemical nature of such causative agents is not fully known, although many authorities believe that viruses are forms of life lower than, for example, bacteria, fungi, protozoa, and other pathogenic agents whose individual organisms can be seen with the aid of an optical microscope.

Some viruses kill their plant hosts. Others retard its growth or deform the plant. Yet others disfigure the plant or its flowers or fruits as, for example by "breaks" or anomalies in color, and morbid irregularities of form.

Despite the paucity of knowledge of plant virus disease etiology, it is known that viruses have many characteristics in common. Among these are their immunity to many chemotherapeutants commonly employed in control of bacteria, fungi, insects, arachnids, and the like; their vigor and aggressiveness within the host plant; their penetration and invasion of the host plant by direct surface contact; their transmission upon or by means of particles or extracts of infected tissues; and the fact that, although a plant pathogenic virus may affect many kinds of plants it characteristically has no effect at all upon animal life; the very long duration of viability of inoculum in the absence of host; and similar functional similarities. Such virus infections characteristically reduce both quantity and quality of economic yield, such as flower or harvested crop, for which many desired plants are grown. Whereas many chemical agents are known which act to kill, in all their life stages, insects, fungi, bacteria, protozoa, and other mono- and polycellular organisms causing plant diseases, without serious injury to the host plant, very few chemical agents are known through whose employment it is possible to control plant disease viruses without seriously damaging or killing the host plant. For this and related reasons, the economic loss caused by the ravages of plant-infesting viruses annually has gone largely unchecked.

Relief has been sought in the breeding of virus-resistant plant varieties. However, this search has not been successful inasmuch as plants which exhibit resistance to virus organisms frequently do not possess desired economic and other properties. Relief from virus attack upon economic plants has also been sought through the planting of desired economic crops in soil known or believed to be largely free from the causative viral organism. This approach, also, has been incompletely successful because many kinds of virus are transmitted by means other than soil, and many kinds of virus can easily be transported, under favorable conditions, for long distances, and with undiminished vitality, with the result that desired crops in formerly virus-free areas may become infected with the virus pathogen while growing.

The present invention contemplates simultaneously the prevention of infection of plants by, the abatement of injury from, and the eradication from or reduction within a host after systematic establishment therein of a plant pathogenic virus. These actions or any combination of them jointly or separately are referred to herein as minimizing the incidence of virus infections.

Accordingly, it is an object of the present invention to benefit growing desired plants. It is a further object of the present invention to protect growing desired plants from invasion of virus plant pathogens. Yet a further object of the present invention is to provide a composition of matter and a process for its employment which will minimize the incidence of virus infection in plants. Other objects of the present invention will become clear from the study of the specification which follows:

According to the present invention, I have discovered a method useful for minimizing the incidence of virus infection in living plants which comprises the step of contacting the said plants with a virucidal amount of a halogen substituted tolyl benzoate, having a total of from 1 to 4 halogen substituents. Such compounds may be represented by the formula

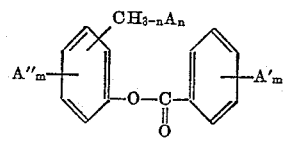

In such formula at least one of A, A' and A" represents halogen, and each other of A, A', and A" represent hydrogen or halogen, $n$ is an integer from 1 to 2 inclusive; $m$ is an integer from 1 to 4, inclusive; and the total of $A_n$, $A'_m$ and $A''_m$ represents from 1 to 4 halogen atoms, inclusive. The chemical compounds whose use is contemplated according to the present invention are crystalline solids soluble in many common organic solvents such as acetone, lower alkyl ethers, lower alkanols, and chlorinated hydrocarbons, and of very low solubility in water. The compounds are readily formulated into compositions which are easily applied in agricultural, olericultural, floricultural, and horticultural practice: and I have discovered that such compositions also are useful for minimizing virus infections of plants when contacted with the said plants. Specifically, I have discovered that the compounds whose use is contemplated according to the present invention may be distributed on an inert, finely divided solid and the resulting preparation employed as a dust useful in minimizing virus infection; that such preparations may be dispersed in water with or without the aid of a surface-active agent and the resulting dispersions employed to contact plants as spray, drench, or wash useful in minimizing virus infection. I have further specifically discovered that the said compounds may be dissolved or dispersed in intimate admixture in an inert liquid, and the resulting preparations employed to contact plants as spray, drench, wash, or aerosol useful in minimizing virus infection. Moreover, such liquid preparations may be further dispersed in water or other liquid carrier or diluent, with or without the aid of a cosolvent or a surface-active agent, and the resulting dispersions employed to contact plants as spray, drench, wash, or aerosol useful in minimizing virus infection.

It is among the advantages of the compositions of the present invention that they are adapted to be readily and conveniently formulated to exhibit excellent spreading, crevice-penetrating, and sticking qualities whereby their application to plants including plants having glaucous, rugose, or villous surfaces is rendered highly effective. It is a further advantage of the present compositions that they are relatively stable under such natural influences as sunlight, rain, and exposure to air, with the result that treatment of plants by application of such compositions thereto tends to afford residual effects which extend protection to the treated plants for an economically useful period of time following the application of such treatment. It is yet a further advantage of the present compositions that they are relatively stable in the presence of such normal impurities and contaminants as are commonly found in natural waters likely to be employed in the preparation of agricultural spray compositions. Yet another advantage of the present compositions is found in the fact of their almost complete compatibility with most insecticides, fungicides, and other agricultural chemicals likely to be applied to desired economic plants in sprays in which such substances may be combined with the antiviral compositions of the present invention.

Compositions of the present invention may be prepared by the distribution of the said compounds on an inert, finely divided solid such as, for example, diatomaceous earth, attapulgitic clay, kaolinitic clay, talc, chalk, wood flour, vermiculite, marble dust, and the like. For present purposes, the term "inert, finely divided solid" is considered to be inclusive also of finely divided insecticidal, fungicidal, and like beneficial chemical substances which are inert chemically with respect to the present virucidal toxicants and which may be employed as components of protective applications to desired plants. Examples of such chemical substances include certain fungicidal metallic salts of substituted carbamic and thiocarbamic acid, elemental sulfur, cryolite, powdered stems and roots of insecticidal plants such as Pyrethrum spp., Derris spp., Cubé spp., Nicotiana spp., *Ryania speciosa*, and similar substances which are practically non-reactive with essential components of the compositions of the present invention, under normally prevailing conditions.

The exact concentration of the virucidal toxicant to be employed in the preparation of a composition according to the present invention is not critical and may vary provided the required concentration or dose of effective agent is supplied to the tissue surfaces of the plants to be protected. The toxicant in liquid concentrate materials employed to supply the desired dosage is generally present at rates of from 1 to 75 percent by weight of concentrate material. In finally divided solid compositions, the concentrations of toxicant may be from about 1 to about 30 percent by weight, or in some cases as much as 50 or 60 percent by weight. In compositions to be shipped, stored, and employed as concentrates wherein bulk or weight must be kept low as possible, the toxicant oftentimes is present in the concentration of from 5 to 95 percent by weight. Liquid compositions containing the desired proportion of the active toxicant compound may be prepared by dissolving such toxicant compound in an organic liquid which may be solely useful as a solvent or may be a solvent which is inherently insecticidal, or may be a solution of a pesticide such as an insecticide or fungicide, or both, in solvent. A suitable solvent may be a lower alkanol, for example methanol, ethanol, propanol, isopropanol, butanol, isobutanol, tertiary butanol, pentanol, and the like; a chlorinated hydrocarbon of lower molecular weight including, in the instance of compositions to be applied as aerial colloids, spontaneously vaporizing chlorinated hydrocarbons; for example, methyl bromide, trichloromonofluoromethane, dichlorodibromomethane, sulfuryl fluoride, tetrachlorodifluoroethane, dibromodifluoromethane, carbon disulfide, carbon tetrachloride, methylene dichloride, ethylene dibromide chloroform, chlorobenzene, and the like: a dilower alkyl ether such as ethyl methyl ether, diethyl ether, di-n-propyl ether, and the like; or preferably, acetone, toluene, methylethyl ketone, or xylene; or a mixture of two or more such liquids may be employed. Particularly useful are preparations comprising insecticidal, bactericidal, or fungicidal materials or both, together with a virucidal amount of a halogen substituted tolyl benzoate of the sort described, with or without wetting or dispersing agents, diluents, and the like. Such combinations are exceptionally useful in virus control because of the fact that many viruses are spread almost exclusively by insect vectors. Such insects, by feeding successively upon virus infected plants and thereafter upon virus-free plants, carry inoculum of the virus from infected to uninfected plants. The presence with the antiviral agent of an insecticide thus provides a doubly effective approach to the minimizing of the incidence of virus infection in plants. Similarly, the invation of intact plant tissues by proliferating fungal mycelium or plant pathogenic bacteria is believed to favor the subsequent invasion of such plant tissue by viruses, even when the fungal or bacterial invasion is of a low level which does not produce symptoms.

Moreover it is believed that plants weakened and morbidly modified as by virus invasion are more attractive to insect, fungous, and bacterial parasites and are more likely to act as host and reservoir for the propagation of such parasites. Hence in many respects, while no true synergism of multiple toxicants in simultaneous action upon a single organism has been demonstrated, the known biological interactions of insect, fungous, bacterial and viral parasites makes the employment of a multiple-action parasiticide unusually desirable. This invention contemplates, then, the compositions prepared by dissolving or dispersing the present antiviral agent on inert finely divided solid dispersions or in solutions of other known pesticides, such as insecticides, bactericides, fungicides, acaricides, and the like. Examples of such dispersions include xylene solutions of 1,1,1-trichloro 2,2-bis (p-chlorophenyl)ethane, acetone solutions of hexachlorocyclohexane, dispersions of p-chlorophenyl-p-chlorobenzenesulfonate together with wetting or dispersing agents on finely divided attapulgitic clay; dichlorodifluoromethane solutions of sesame seed oil insecticidal extract of Derris spp. and the like. Such dispersions of the toxicant compounds may be made more easily and more widely useful by the incorporation therein of wetting, dispersing, or emulsifying agents by whose action the concentrate composition is more easily dispersed as an emulsion, colloid, or suspension upon mixing with water.

In the preparation of wettable powder compositions, the active antiviral toxicant is conveniently dispersed in and on a finely divided inert solid. Such compositions may contain other finely divided solid carriers in addition to the solid or solids whereupon the toxicant is distributed, such as chalk, talc, wood or cereal flour, and the like. In such operations, the solid carrier may be mixed and mechanically ground with the antiviral toxicant or with a solution of the toxicant in an organic solvent which solvent is thereafter vaporized to remove it, leaving the toxicant distributed in and on the solid which may, if desired, thereafter be ground or otherwise resubdivided. A surface-active dispersing agent and like adjuvants may, if desired, also be incorporated into such solid composition.

In either liquid or solid preparations according to the present invention, surface-active dispersing agents, when employed, are generally employed in the amount of from about 1 to about 20 parts per hundred parts by weight of the resulting composition.

Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps, and the like, for example the products commercially available under such trademarks as Tween, Span, Triton, Nacconol, and the like.

The process of the present invention is practiced by contacting the plants which it is desired to protect with at least a virucidal amount of one of the compounds whose use is contemplated according to the present invention, or with at least a virucidal amount of a composition containing one of the said compounds.

In practice it is impossible to designate a minimum critical concentration or amount of the active chemical compound to be included in a preparation to be employed in such virucidal contacting of plants. Compositions containing the said compounds in concentrations as low as from one to fifty parts per million, applied as heavy deposits upon the said plants will result in the contacting of the said plants with a virucidal amount of the said compounds.

It has been discovered that compositions containing not less than 0.03 percent of at least one of the active compounds by weight of the ultimate composition are conveniently employed, are economical of toxicant, and in practice give generally good results without undue attention to application techniques and the like. Such compositions, then, are the preferred compositions of the present invention. Such compositions are prepared by dispersing in an inert material, liquid or solid, about four ounces of the active compound in about 800 pounds of ultimate composition. When the active compound is dispersed in water, about four ounces of such compound may be dispersed in about 100 gallons of water to obtain one embodiment of the present preferred compositions.

Compositions containing the said compounds in greater concentration may, of course, be employed, and no practical maximum of such concentration is known to exist, the desired minimizing of incidence of virus infection being achieved at much higher concentrations.

The method of the present invention is usually practiced by spraying, dusting, or otherwise generally applying the present compounds, or compositions containing the present compounds, in virucidal amount to the plants wherein it is desired to minimize the incidence of virus infection. Conveniently, compositions containing the active toxicant are employed, because they are adapted to be dispersed in water or applied as dusts in economical and effective amounts much more easily than are the unmodified compounds.

In general good results are obtained when such compositions, formulated as water dispersions, are applied as a fog, mist, or spray to living plants. Such application may be made, according to general agricultural practice, by the use of hand-operated or power-driven spray equipment. As employed herein, the term "spray equipment" is meant to be understood in its broadest sense. Thus, the term is inclusive of gas-propelled aerosols, of small hand-sprayers which project a spray in small quantity in immediate response to the force of an arm stroke applied by means of a handle to the end of an air-pump piston; and also to hand-powered equipment with provision for prompt distribution of larger volumes of the aqueous dispersion of the compositions of the present invention, by, for example, the forceable injection, under hand impetus, of a considerable pressure of air into a confined space which contains also the aqueous dispersion and is connected by a means of tubing and hoses to an orifice or nozzle for the distribution of such compositions under the force of applied air pressure, as a control valve is opened. The term is also inclusive of power-driven equipment which may also be power propelled, including that which produces essentially an aerial colloid in the form of a fog-dispersion of extremely fine particles of spray composition which contain relatively high proportions of toxicant; or conventional agricultural sprayers employing either direct liquid piston pressure or accumulated air-pressure, and also inclusive of aircraft-carried equipment in whose operation the forward motion of the airplane against the rearward motion of its propellor blast or the downward motion of the rotor stream of a helicopter may provide a significant portion of the distributive force.

Furthermore, good results are obtained when dry, finely divided compositions according to the present invention are applied as dusts. Such compositions may be applied by hand, in such methods as dusting the said composition onto the plants to be protected from a brush or small broom; or agitating it within a porous container such as an open-mesh fabric bag or seive; such applications may be made by the use of a hand-powered agricultural duster, such as those wherein the composition is entrained in a stream of moving air impelled by a hand-powered reciprocating piston, or impelled by a crank-and-gear-driven rotary air impeller. Good results are also obtained when the present compositions are applied by power driven agricultural dusting equipment.

Within the metes and bounds of my invention, I prefer to use as active antiviral agents the compounds whereof the methyl group characteristic of the tolyl moiety contains at least one halogen substituent, as being generally superior virucides to the other compounds whose use I contemplate, the methyl group of whose tolyl moiety has no such substituent. These preferred compounds correspond to the formula $$\underset{A'}{\underset{|}{\bigotimes}}-O-\overset{O}{\underset{\|}{C}}-\underset{A''}{\underset{|}{\bigotimes}}$$
(with $CH_{3-n}X_n$ on the left ring)

wherein X is a halogen, $n$ is an integer from one to two, inclusive, and each of A' and A'' is a halogen or hydrogen.

The following examples, the quantitative appraisal of which followed accepted statistical methods, illustrate the present invention but are not to be construed as limiting it.

*Example 1*

Pinto bean seedlings of replicate groups in the early two leaf stage of growth were lightly dusted with 500-mesh silicon carbide dust, to establish minute and shallow surface lesions on the leaves. Immediately thereafter, the plant surfaces were swabbed with a liquid suspension of the finely subdivided tissues of black valentine bean plants systemically infected with southern bean mosaic virus, whereby the pinto bean plants were inoculated with the said virus. The inoculated bean plants were then immediately rinsed with running water and thereafter allowed to dry. Drying required about three to four hours. Soon after the plants had dried there was applied to them, as a thorough wetting spray, an aqueous dispersion of $\alpha,\alpha$-dichloro-o-tolyl benzoate in the concentration of 4 ounces per 100 gallons of ultimate composition. The said bean plants were then allowed to grow under favorable conditions for a week, and thereafter examined. Further, yet other groups of bean plants were treated in all respects identically except that there was omitted from the spray composition the $\alpha,\alpha$-dichloro-o-tolyl benzoate.

Assay of the results of such tests is simplified by the fact that, on the pinto variety of bean used in the present tests the southern bean mosaic virus produces local areas, or spots, of necrotic tissue, the number of which gives a reliable indication of the extent of the virus infection. In appraising results of the present test, the average count of virus-caused necrotic areas on the plants of the groups which were inoculated but not protected by the benzoate compound was taken to be 100 percent. On this basis, the bean plants treated with the present compositions were found to be 1 percent infected. Reciprocally, this was rated as 99 percent control. In a check operation, young bean plants were grown under similar conditions and from seed of the same lot, were similarly dusted with 500-mesh silicon carbide, but were neither inoculated with the virus nor sprayed with the virucide-candidate chemical. These plants were examined and no virus infection was noted. An appraisal of the rate and apparent health of growth of the inoculated and treated plants in comparison with the uninoculated and untreated checks yielded an estimate of zero net injury to the inoculated and treated bean plants.

*Example 2*

The action of α,α-dichloro-o-tolyl benzoate was found to be of value as an eradicant of an established systemic infection of southern bean mosaic virus in black valentine beans. In a test, two groups of seedling black valentine beans in the two leaf stage were inoculated by lightly dusting them with 500-mesh silicon carbide dust and thereafter swabbing them with a suspension in water of finely divided fresh leaves of bean plants known to be infected with the virus. The two groups of infected plants were then grown in a greenhouse under favorable conditions for three days to allow the disease to become established. Thereupon one group of the infected bean plants was treated by application to the plant surfaces of a thorough wetting spray of an aqueous dispersion containing α,α-dichloro-o-tolyl benzoate as sole virucidal agent in a concentration of 4 ounces per 100 gallons of ultimate composition. Thereafter, the treated plants were returned to favorable growing conditions and their growth continued. The treated group is hereinafter designated as group A. The other group was left untreated, and is hereafter designated as group B. After 20 days of further period of growth, a representative collection of leaves was removed from the plants of group A and thoroughly washed to remove any residual spray deposit from their exterior surfaces; a similar representative collection of leaves was removed from the plants of group B; each collection was separately finely ground in water in a mortar and pestle, whereby there were produced two separate groups of inoculum material; one, representing tissues from the treated plants of group A; the other representing tissues from the untreated plants of group B. Each of the resulting inocula was then applied uniformly by swab to the silicon carbide-dusted leaves of pinto bean seedlings of a group, for convenience herein called an assay group, in the two leaf stage. The pinto bean plants of the first such assay group were exposed to infection with the virus at a rate corresponding to the degree of virus infection present in the plants of group A. The plants of the second such assay group were exposed to infection with the virus at a rate corresponding to the degree of virus infection present in the plants of group B. In appraising the results, the count of resulting mosaic lesions on the leaves of the plants of the assay group which has been inoculated with a suspension of tissues of plants of group B was rated at 100 percent. On the scale thus defined, the assay plants inoculated with a suspension of tissues of plants of group A showed, seven days after inoculation, 43 percent infection with southern bean mosaic virus. Reciprocally, this was expressed and interpreted as 57 percent reduction of systemic virus infection in the valentine bean plants of group A, as a result of their treatment according to the present invention.

*Example 3*

In a further test conducted according to procedures identical with those outlined under Example 2, α,α-dichloro-o-tolyl benzoate was tested as virus eradicant by application of an aqueous dispersion containing the said benzoate in a concentration equivalent to 1 ounce per hundred gallons of ultimate dispersion. As a result of this test there was obtained a reduction in the measured systemic concentration of the southern bean mosaic virus growing systemically in black valentine variety beans, which was determined after diminution by all statistical weightings, to be a 10 percent reduction.

*Example 4*

In a further test conducted according to procedures identical with those outlined under Example 1, α-chloro-o-tolyl p-chlorobenzoate was tested for virucidal action. Under the conditions of the test, there was obtained complete, that is to say, 100 percent prevention of infection by the pathogenic virus.

*Example 5*

In a further test conducted in exactly the procedures outlined in Example 1, α-chloro-o-tolyl benzoate was tested for virucidal activity. As a result of these tests, there was obtained 100 percent prevention of infection by the pathogenic virus.

*Example 6*

In procedures exactly like those employed in Example 1, α-chloro-p-tolylbenzoate was tested for virucidal activity. As a result of these tests, there was obtained a 93 percent control of the virus infection.

*Example 7*

In further tests conducted in exactly the manner described in Example 1, the virucidal activity of α,4-dichloro-o-tolyl benzoate was tested. As a result of these tests, there was obtained a 100 percent control of the virus pathogen.

*Example 8*

In procedures exactly like those employed in Example 1, 3-fluoro-p-tolyl benzoate was tested for virucidal activity. As a result of these tests there was obtained a control of the virus, appraised after diminution by all allowable statistical factors, to be 13 percent control.

In similar tests, the efficacy of compositions according to this invention, for the control of plant pathogenic viruses, is demonstrated with the employment of other compounds such as:

α,α-Dibromo-o-iodo-p-tolyl 4-fluorobenzoate $$Br_2CH-\phantom{X}\overset{I}{\underset{}{\bigcirc}}\phantom{X}-O-\overset{O}{\underset{\|}{C}}-\bigcirc-F$$

α-Iodo-p-bromo-o-tolyl-4-bromobenzoate $$Br-\bigcirc\overset{CH_2I}{\underset{}{-}}-O-\overset{O}{\underset{\|}{C}}-\bigcirc-Br$$

α,α-Diiodo-o-tolyl-4-iodobenzoate $$\overset{CHI_2}{\underset{}{\bigcirc}}-O-\overset{O}{\underset{\|}{C}}-\bigcirc-I$$

α,α-Difluoro-o-bromo-p-tolyl benzoate $$F_2HC-\bigcirc\underset{Br}{-}-O-\overset{O}{\underset{\|}{C}}-\bigcirc$$

Certain of the compounds whose use is contemplated according to the present invention are the subjects of copending applications of Laurence A. Pursglove of Midland, Michigan, numbers 758,673 and 758,674, filed September 3, 1958, and joint application of Laurence A. Pursglove and Janet N. Paige, Serial No. 771,973, filed November 5, 1958.

The α-chlorotolyl compounds employed according to the present invention may be prepared by direct chlorination of the corresponding tolyl benzoates in the presence of a catalytic amount of phosphorus trichloride at a temperature in the range, preferably, of 60° to 120° C. employing approximately 2 atomic equivalents of chlorine with each molecular equivalent of the benzoate compound. The α-monofluoro-, α-monobromo- and α-monoiodo- compounds employed according to the present invention may be prepared from the corresponding α-chlorotolyl benzoate prepared as stated above by a metathetical reaction with, respectively, sodium fluoride, sodium bromide or sodium iodide in acetone at a temperature of from 40° to 150° C.

The α,α-dichlorotolyl compounds employed according to the present invention may be prepared by direct chlorination of the corresponding α-monochlorotolyl benzoates in the presence of a catalytic amount of a phosphorus chloride which may be phosphorus trichloride at a temperature in the range, preferably, of 120° to 200° C., employing approximately 2 atomic equivalents of chlorine with each molecular equivalent of the α-monochlorobenzoate compound. The α,α-difluoro-, α,α-bromo- and α,α-diiodo-compounds employed according to the present invention may be prepared from the corresponding α,α-dichloro-compounds prepared as stated above by metathetical reaction with, respectively, sodium fluoride, sodium bromide or sodium iodide in acetone at a temperature of from 40° to 150° C. The crude, that is to say, the unpurified reaction product of any of such preparatory reactions, wherein there may be more than one compound of the type whose virucidal use is taught herein, may be employed in the practice of the present invention. However, if impurity of such crude product or other consideration renders it desirable to employ a purified compound, such compound may be separated from the reaction mixture in which it was prepared, and may be purified, in manners well known in the art including, for example, removal of solvents by vaporization, and recrystallization of the desired product from solvents.

The tolylbenzoate starting materials to be halogenated to furnish the α-halotolyl benzoates, and the nuclearly halogenated tolyl benzoates to be employed as antiviral agents are prepared in known manners. In one such preparation, a benzoyl chloride which may be a nuclearly-substituted benzoyl chloride is added slowly, portionwise, and with stirring to the corresponding meta-, ortho-, or para-cresol or substituted cresol at temperatures in the range of 90° to 150° C. in the presence of, if desired, an inert reaction medium which may be a halobenzene. Heating and stirring are continued for a period of time to carry the reaction to completion. If desired, the resulting compound may be separated and purified in known manners, including recrystallization from solvents.

Various modifications of the methods and compositions of the present invention may be made without departing from the spirit or scope thereof, and it is to be understood that I limit myself only as defined in the appended claims.

I claim:

1. A method useful for minimizing the incidence of virus infections in a plant which includes the step of contacting the said plant with a virucidal amount of a halogen-substituted tolyl benzoate having at least one halogen in the methyl group of the tolyl moiety and a total of from 1 to 4 halogen substituents.

2. A method useful for minimizing the incidence of virus infections in a plant, which includes the step of contacting the said plant with a composition containing at least 0.03 percent by weight of ultimate composition of a halogen substituted tolyl benzoate having at least one halogen on the methyl group of the tolyl moiety and a total of from 1 to 4 halogen substituents.

3. An agent for minimizing the incidence of virus infections of a plant, which comprises a biologically inert carrier having dispersed therein at least 0.03 percent by weight of ultimate composition of a halogen substituted tolyl benzoate having at least one halogen substituent on the methyl group of the tolyl moiety and a total of from 1 to 4 halogen substituents.

4. An agent for minimizing the incidence of virus infection of a plant, which comprises an inert finely divided solid having, in intimate admixture therewith, at least 0.03 percent by weight of ultimate composition of a halogen substituted tolyl benzoate having at least one halogen in the methyl group of the tolyl moiety and a total of from 1 to 4 halogen substituents.

5. An agent for minimizing the incidence of virus infection of a plant, which comprises from 10 to 99 percent by weight of a halogen substituted tolyl benzoate having at least one halogen on the methyl group of the tolyl moiety and a total of from 1 to 4 halogen substituents, in intimate admixture with a surface active agent.

6. An agent for minimizing the incidence of virus infection of a plant comprising p-chloro-α-chloro-o-tolylbenzoate dispersed in a biologically inert carrier in a concentration not less than 0.03 percent by weight of ultimate composition.

7. An agent for minimizing the incidence of virus infections of plants which comprises an inert carrier, at least one parasiticide selected from the group consisting of insecticides, fungicides, and bactericides, and a halogen substituted tolyl benzoate having at least one halogen on the methyl group of the tolyl moiety and a total of from 1 to 4 halogen substituents.

References Cited in the file of this patent

UNITED STATES PATENTS 1,953,629   Pfaff _____ Apr. 3, 1934

OTHER REFERENCES

King: U.S. Dept. of Agr. Handbook No. 69, May 1954, p. 73.